United States Patent
Coyle, Jr.

(10) Patent No.: US 12,537,089 B1
(45) Date of Patent: Jan. 27, 2026

(54) SUBJECT RECOGNITION AND RECOMMENDATION METHODS AND APPARATUS

(71) Applicant: Thomas Marvin Coyle, Jr., Fairfax, VA (US)

(72) Inventor: Thomas Marvin Coyle, Jr., Fairfax, VA (US)

( * ) Notice: Subject to any disclaimer, the term of this patent is extended or adjusted under 35 U.S.C. 154(b) by 533 days.

(21) Appl. No.: 18/071,874

(22) Filed: Nov. 30, 2022

(51) Int. Cl.
*G06V 10/764* (2022.01)
*G16H 20/60* (2018.01)
*G16H 50/30* (2018.01)

(52) U.S. Cl.
CPC .......... *G16H 20/60* (2018.01); *G06V 10/764* (2022.01); *G16H 50/30* (2018.01)

(58) Field of Classification Search
CPC ....... G16H 20/60; G16H 50/30; G06V 10/764
See application file for complete search history.

(56) References Cited

U.S. PATENT DOCUMENTS

| | | | | | |
|---|---|---|---|---|---|
| 2011/0318717 | A1* | 12/2011 | Adamowicz | ........... | G16H 20/60 434/127 |
| 2013/0273509 | A1* | 10/2013 | Mutti | ................ | G09B 19/0092 434/127 |
| 2017/0323174 | A1* | 11/2017 | Joshi | ..................... | G06F 16/583 |
| 2022/0012467 | A1* | 1/2022 | Kuo | ........................ | G16H 40/67 |
| 2024/0009205 | A1* | 1/2024 | Nencioni | ............... | A61K 45/06 |

* cited by examiner

*Primary Examiner* — Phuoc Tran
(74) *Attorney, Agent, or Firm* — Krishna Kalidindi; Christopher Mitchell

(57) ABSTRACT

A machine learning backed photo recognition application that gives users a health risk assessment based on nutritional value of the foods consumed. This software labels not just standard western foods, but ethnic and fusion dishes as well to provide increased accuracy. This software also uses data from USDA health guidelines and risk assessments from American Association of Cancer Research (AACR guidelines, dietitian specific plans/requirements issued to the patient, and NIH guidelines) in order to provide the ability to highlight a health risk score based on nutritional intake specific to the individual and provide machine learning analysis to flag to the nutritionist, dietitian, and patient risk scores, significant changes in diet/food intake, and early signs of medical problems for early intervention. Medical professionals are provided a dashboard that complies all patient information and provide a snapshot of dietary trends. Patients can enter their symptoms after log in and receive feedback on ways to alleviate those symptoms.

20 Claims, 12 Drawing Sheets

SUBJECT RECOGNITION AND RECOMMENDATION METHODS AND APPARATUS

RELATED APPLICATION/CLAIM FOR PRIORITY

This non-provisional patent application claims priority to and benefits of U.S. Provisional Patent Application No. 69/837,438, filed on Nov. 30, 2021, the subject matter of which is incorporated in its entirety herein by reference.

BACKGROUND

1. Technical Field

This disclosure relates generally to subject recognition and recommendation methods and apparatus. For example, an embodiment provides a machine learning backed photo recognition application that gives dietitians and patients a health risk assessment based on nutritional value of the foods they eat and a real time process to take corrective action.

2. Description of Related Art

Dietitians and nutritionists working with cancer patients have to rely on manual food journaling to track food intake and assess whether they are eating foods that are risky to patient health and to make sure patients are meeting their dietary health goals. There is also no easy way to make recommendations for healthier foods. For every single registered dietitian working in cancer clinics, there are 2300 patients per US News and World Report. There are staff shortages and not enough dietitians to serve patients.

Related art technologies are not giving a health risk score based on nutritional intake. Further, related art photo recognition itself has inaccuracies, such as mislabeling food (e.g., labeling a photo of a venison burger as "tuna casserole"). There is no technology that allows users to photograph food with consistent accuracy of the food item and then if there is something unhealthy, provide a healthy alternative that is close to the food being photographed so that the user can stay within the spirit of the diet, and that can provide nutritionists and dietitians real time analysis of the patients' diets and trends under their care.

This Background section provides useful information for understanding this disclosure. Accordingly, the Background section may include ideas, concepts, and/or recognitions that were not what is known or appreciated by those skilled in the pertinent art prior to a corresponding invention date of the subject matter disclosed herein.

SUMMARY

An aspect of the disclosure is to provide comprehensive subject recognition and/or recommendation methods and apparatus. For example, software may label not just standard western foods, but may also label ethnic and fusion dishes as well so as to provide increased accuracy. Software may use data from USDA health guidelines, American Association for Cancer Research guidelines, and risk assessments from NIH in order to provide the ability to highlight a health risk score based on nutritional intake and guidance provided by a dietitian, such as specific guidance regarding protein, fiber, and other macronutrient intake specific to the individual, and provide machine learning analysis to flag to the nutritionist, dietitian, and patient risk scores, significant changes in diet/food intake, and early signs of medical problems.

According to an embodiment, a method may include receiving a digital image of a subject in/by an application executing on a computing device, identifying the subject and a quantity of the subject by applying a machine learning tool to evaluate the digital image, determining at least one characteristic of the subject based on the identified subject and subject quantity, correlating the at least one subject characteristic to a user score, identifying an alternative subject based on the at least one subject characteristic and the user score, and providing the alternative subject identity and a corresponding quantity.

According to another embodiment, a computing device may include a memory, an image capturing device, a user interface, a communication interface, a processor, and a communication bus interconnecting each of the memory, the image capturing device, the user interface, the communication interface and the processor. The user interface may be configured to receive identifying information from a user, and present information to the user. The image capturing device may be configured to capture an image of a subject. The communication interface may be configured to communicate data with a node at a network location, the node further including a memory, a processor and a communication interface. The processor may be configured to identify the captured image and a quantity of the subject by applying a machine learning tool to evaluate the image, determine at least one characteristic of the subject based on the identified subject and subject quantity, correlate the at least one subject characteristic to a user score, identify an alternative subject based on the at least one subject characteristic and the user score, and provide the alternative subject identity and a corresponding quantity. The memory may be configured to store the user identifying information, the captured image and quantity data, the at least one subject characteristic, the user score, and the alternative subject identity.

BRIEF DESCRIPTION OF THE DRAWINGS

The several features, aspects, and advantages of example embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments. The embodiments can be practiced without one or more of the specific details, or with other methods, components, materials, etc. In other instances, well known structures, materials, or operations are not shown or described in detail to avoid obscuring aspects of the example embodiments.

Reference throughout this specification to an "example embodiment" or "example embodiments" or "an embodiment" means that a particular feature, structure, or characteristic as described is included in at least one embodiment. Thus, the appearances of these terms and similar phrases in various laces through this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

Numerous problems exist with respect to related art subject recognition and recommendation. As stated above, dieticians and nutritionists working with cancer patients have to rely on manual food journaling to track food intake and assess whether they are eating foods that are risky to patient health. There is also no easy way to make recommendations for healthier foods. For every single registered dietitian working in cancer clinics, there are 2300 patients per US News and World Report. There are staff shortages and not enough dietitians to serve patients. The disclosed embodiments address these problems.

Figure 8:
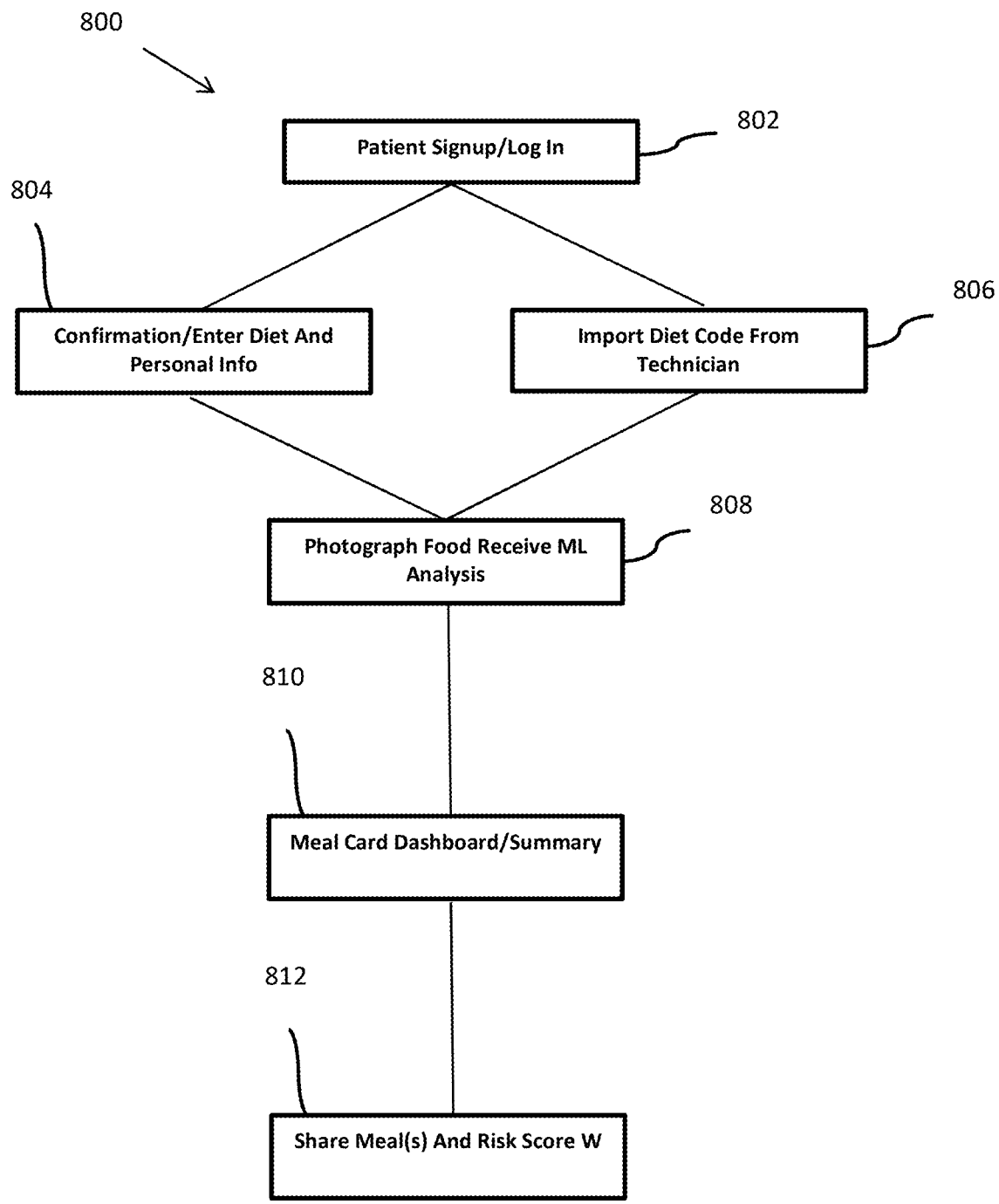
FIG. 8 illustrates a user journey workflow according to an embodiment.

FIGS. 1-7 illustrate screens 100-700 of a subject recognition application executing on a computing device according to various embodiments. FIG. 8 illustrates a user journey workflow 800 according to an embodiment. When a user starts the application, an application home screen 100 of FIG. 1 may be displayed (e.g., a screen of an application executing on a cellphone) in operation 802. The application home screen 100 may include application indicia 102, a login input 104, and/or a register input 106.

Figure 1:
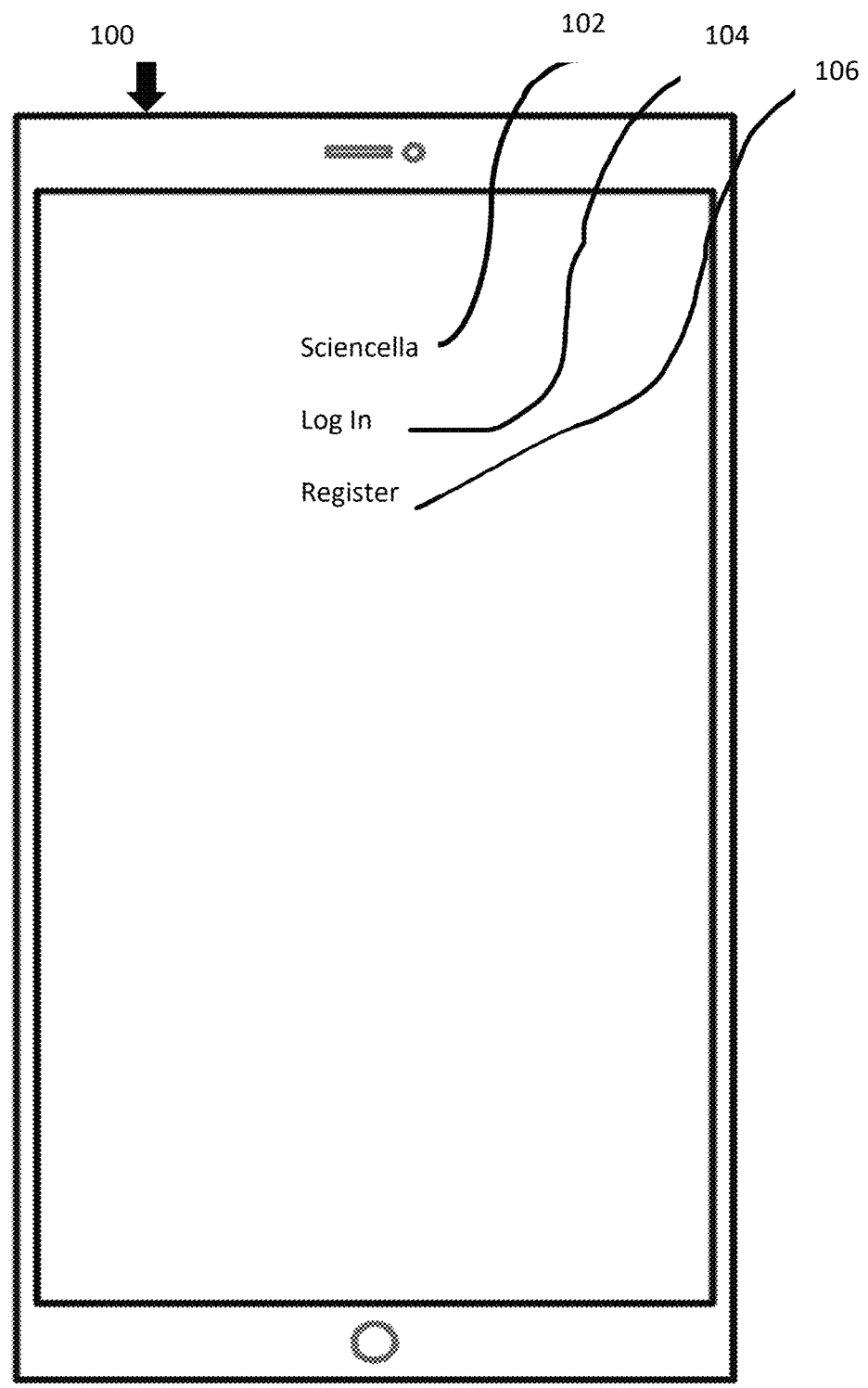
FIG. 1 illustrates an application home screen according to an embodiment.
Figure 2:
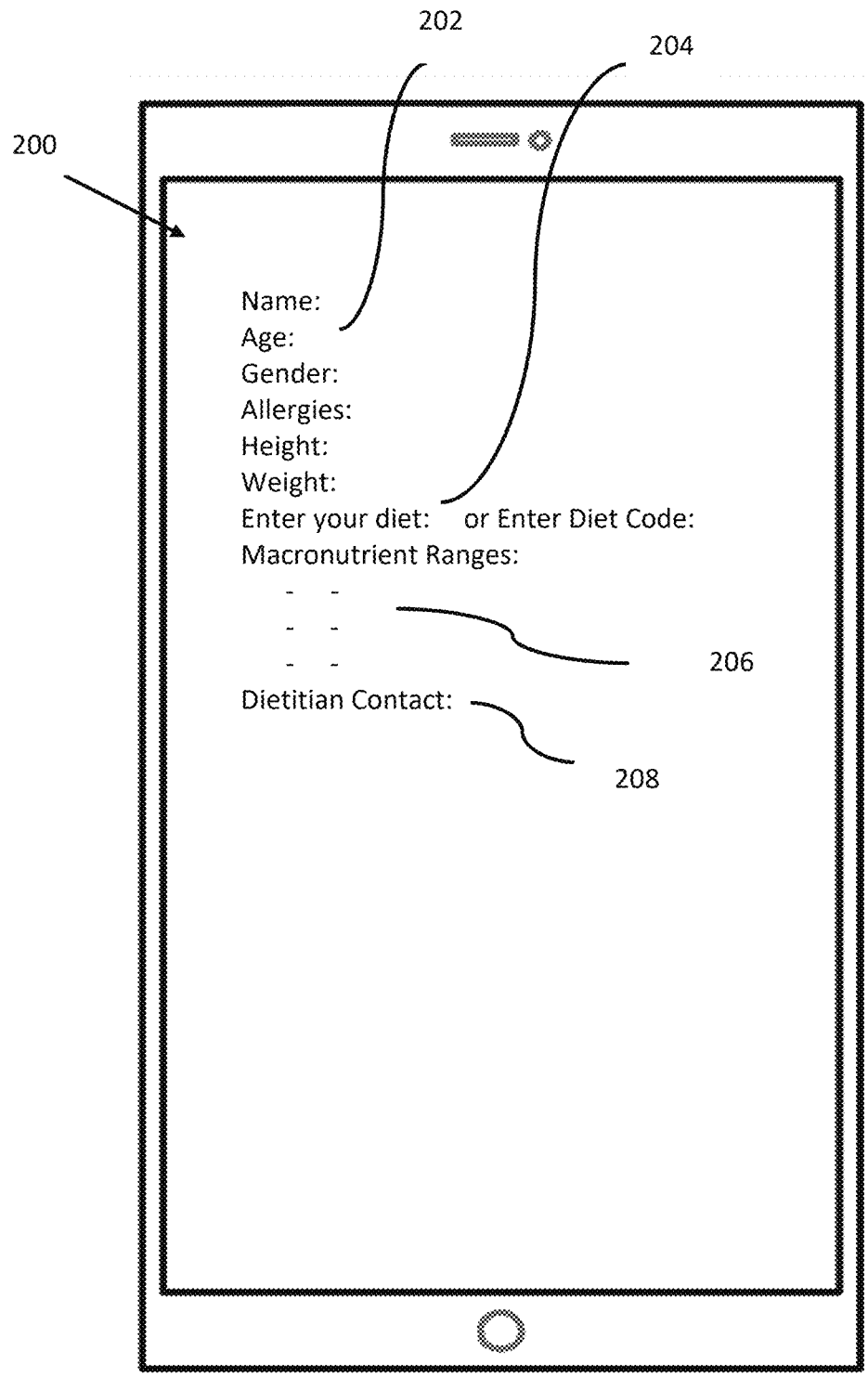
FIG. 2 illustrates a user input screen according to an embodiment.

During a registration and/or at a later point after registration, the user (or someone working on behalf of the user) may be prompted to provide information via a user input screen 200 of FIG. 2 (e.g., a patient input dashboard) in operations 804 and/or 806. The user input screen 200 may include biographical information input 202, diet input 204, macronutrient information input 206, dietician input 208 (e.g., dietitian contact information), and/or an accept received values control (not shown). The diet input 204 may receive diet-specific information (e.g., Keto, low sodium) and/or a corresponding diet code, and the macronutrient information input 206 may receive macronutrient information for a patient's specific dietary plan and may be used for risk score analysis. The accept received values control may be used to accept input sent by, e.g., a dietitian for one or all of the above inputs.

Figure 3:
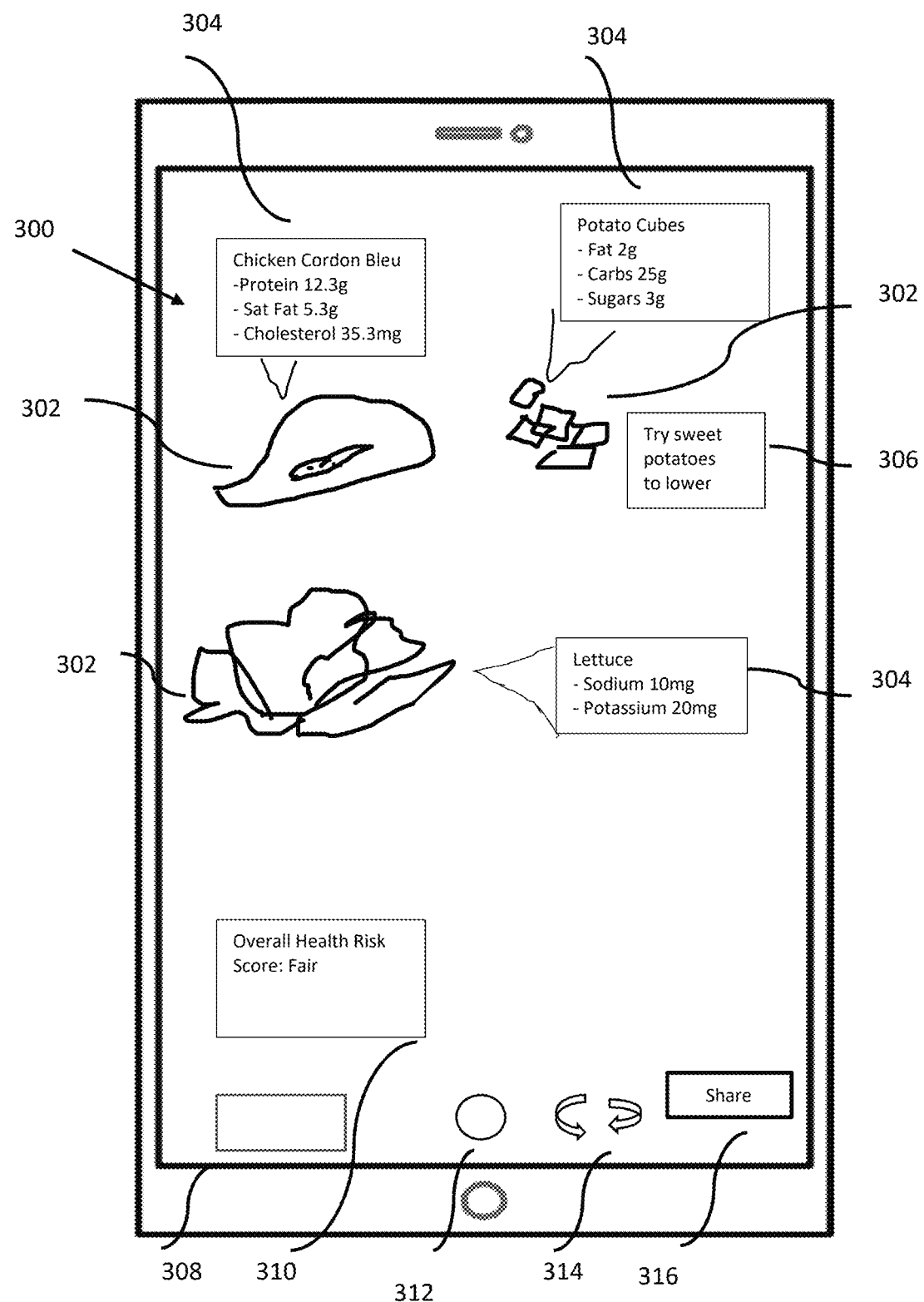
FIG. 3 illustrates a subject recognition screen according to an embodiment.
Figure 4:
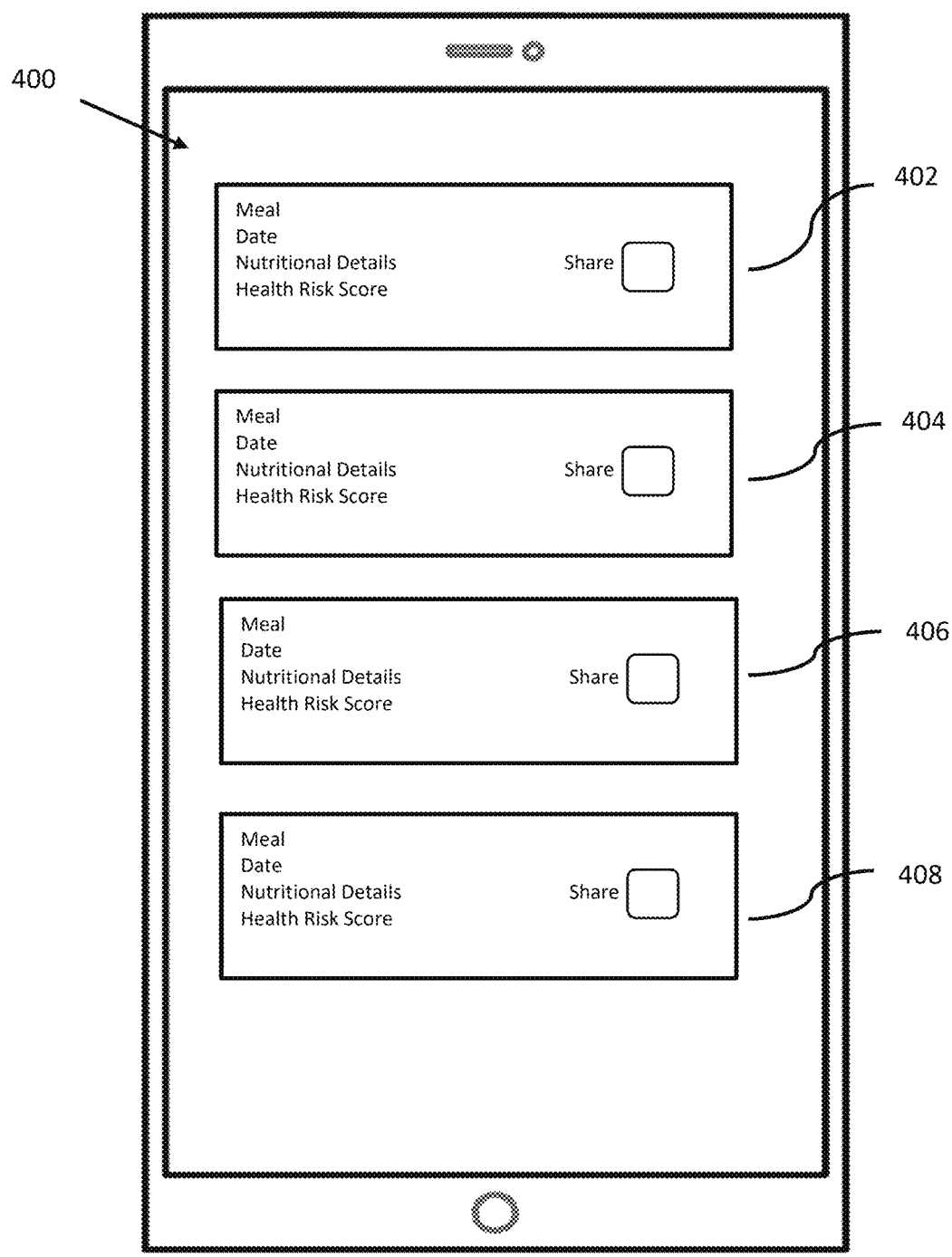
FIG. 4 illustrates a meal highlights screen according to an embodiment.

After registration and/or login, a subject recognition screen 300 of FIG. 3 may be displayed by the application. The subject recognition screen 300 may include a subject display 302, a subject characteristics display 304, a call out (alternatives) display 306, a camera roll selection control 308, a health risk score display 310, a begin analysis control 312, undo/redo controls 314, and/or a send control 316. The subject recognition screen 300 may be used by a user to photograph (or upload a photo) a subject 302 (e.g., a meal including foods). A photograph may be taken from the application by pressing a photo button on the computing device, or by using a camera roll selection control 310. Either approach may result in the application receiving an image (e.g., a digital image) of the subject in operation 808. A user may select the begin analysis control 312 to initiate recognition of the subject and identification of alternatives. It should be appreciated that in FIG. 3, three separate subjects (Chicken Cordon Bleu, Potato Cubes, and Lettuce) are actually recognized due to the meal including sides. For clarity, a single subject is discussed though in practice multiple subjects may be the norm.

The application identifies the subject 302, including a quantity (size) of the subject 302. Identification may be based on or result from a machine learning tool (computer vision, training). From the identified subject, characteristics of the subject may be determined and shown using the characteristics display 304. A user score may be determined and displayed using the health risk score display 310 in operation 810. For example, the characteristics of the subject may be used in determining the user score. Further, an alternative subject may be identified based on the at least one subject characteristic and the user score, and may displayed using the call out display 306. That is, the alternative subject (and possibly a quantity) may be provided. The user may use the send control 316 to send or share some or all of the above information with the user's oncologist or other stakeholders at operation 812.

Figure 9:
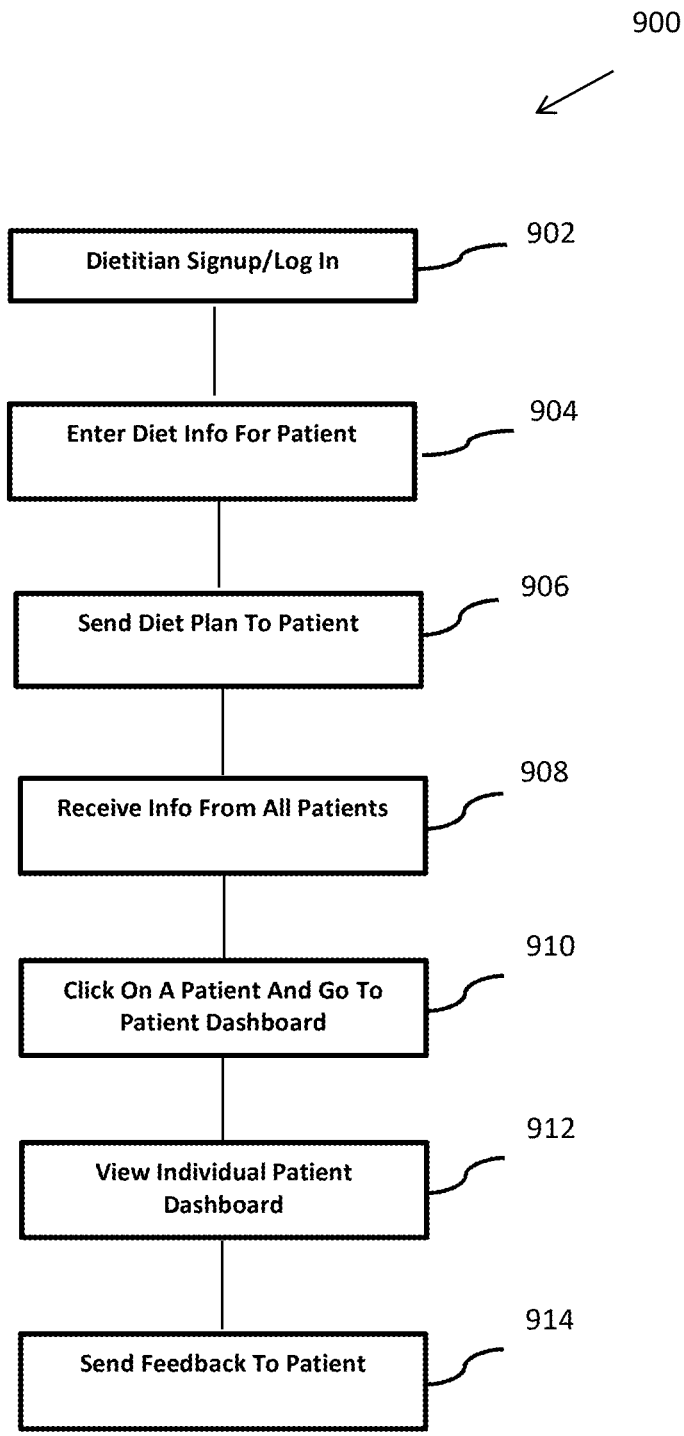
FIG. 9 illustrates a dietitian workflow according to an embodiment.

Embodiments may include additional functionality shown in the additional screens of FIGS. 4-7 and in the workflow of FIG. 9. Meal highlights showing a number of different meals 402-408 including corresponding scores may be displayed using the meal highlights screen 400 of FIG. 4. Symptoms may be entered using symptom inputs 702-710 of the symptom tracker screen 700 of FIG. 7 so as to alter diet recommendations. Functionality may be provided to a third-party such as a dietitian or other provider through a patient summaries screen 500 of FIG. 5 and a patient data screen 600 of FIG. 6.

More specifically, after a dietitian registers and/or logs in during operation 902 of FIG. 9, a dietitian may enter a diet customized for a particular patient and transmit the diet to the patient in operations 904 and 906. The dietitian may receive information discussed above with respect to all users in operation 908 and may interact with that information such as by viewing information for a particular patient in operations 910 and 912, and sending feedback to the patient in operation 914.

Figure 5:
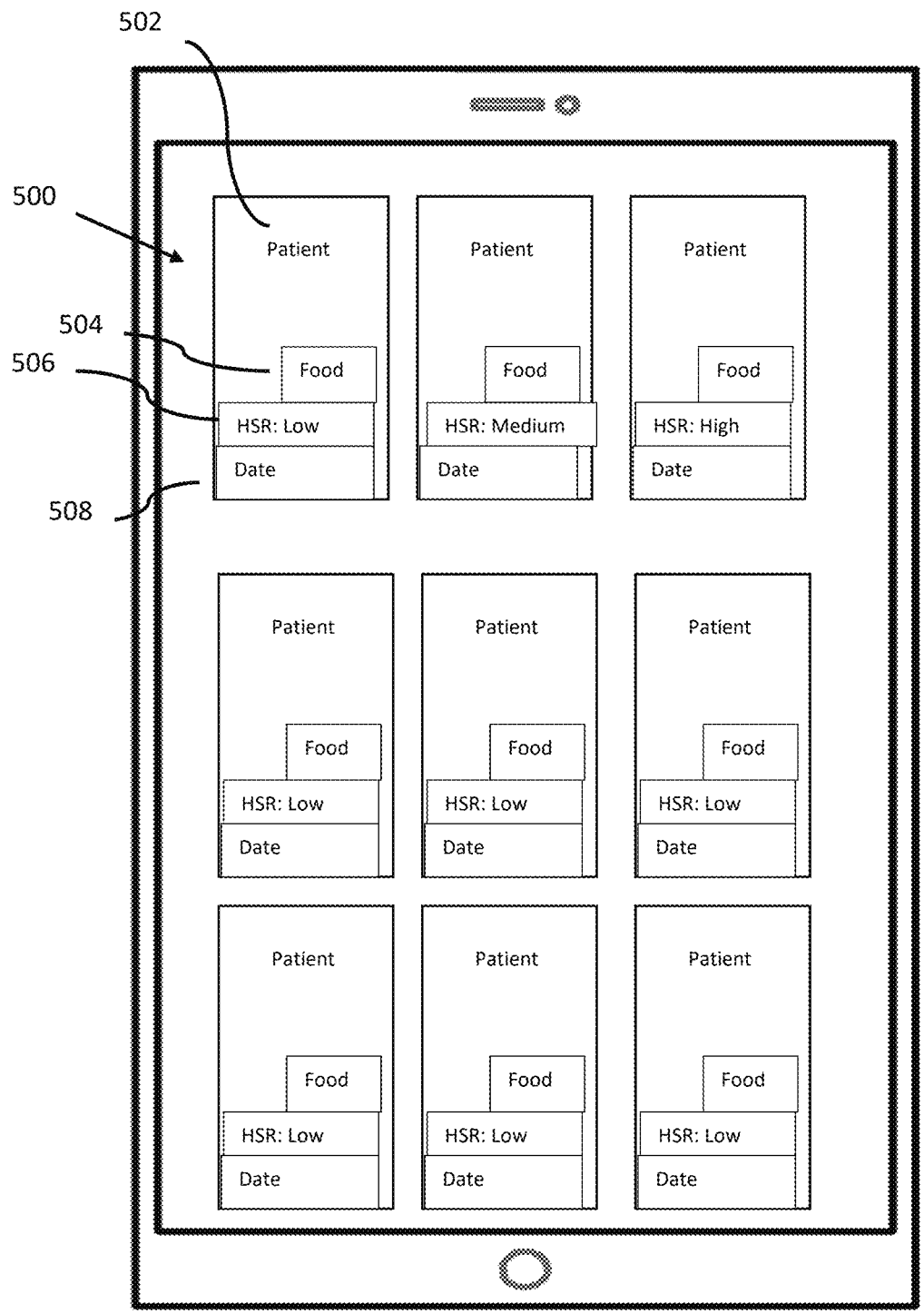
FIG. 5 illustrates a patient summaries screen according to an embodiment.
Figure 6:
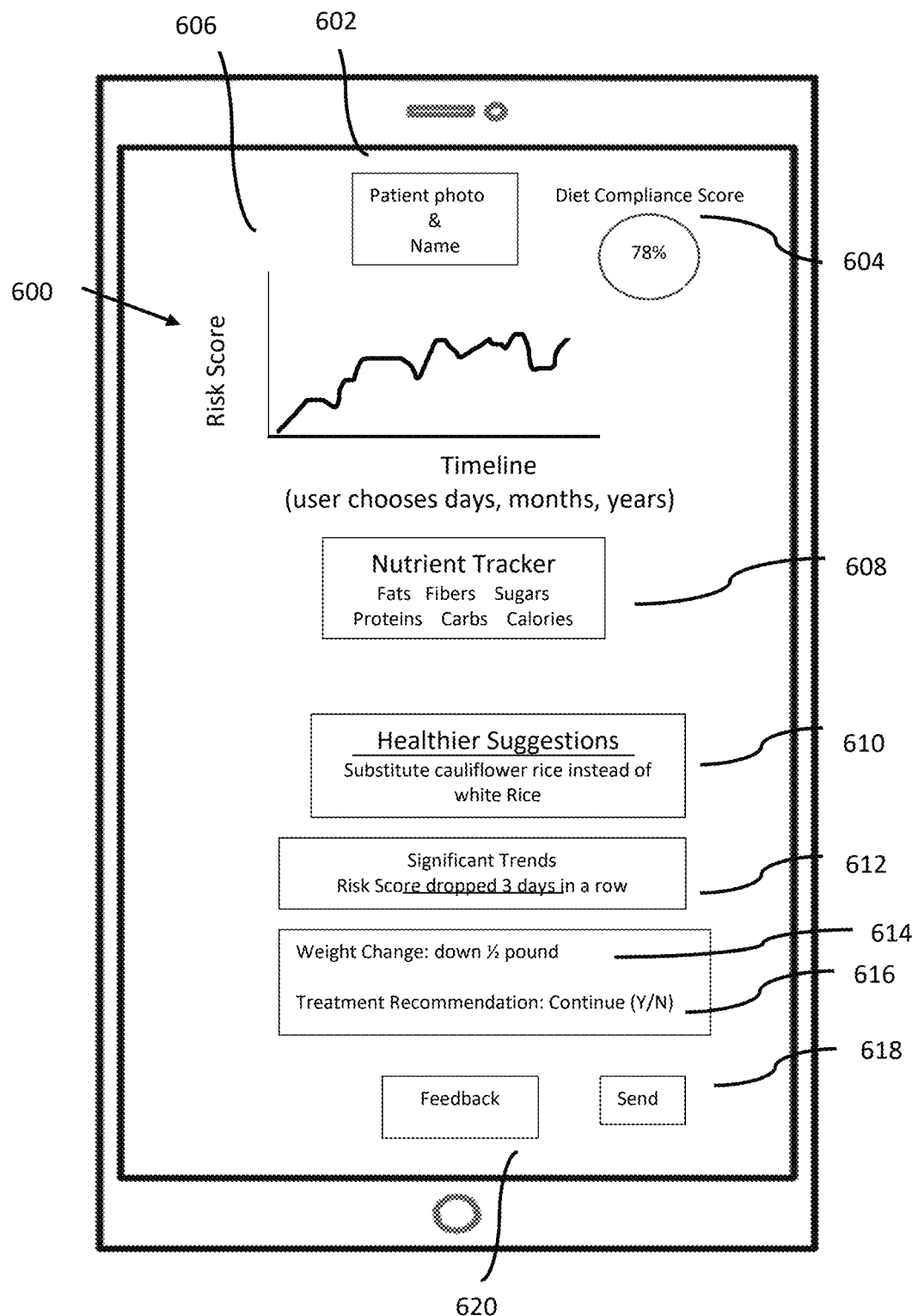
FIG. 6 illustrates a patient data screen according to an embodiment.
Figure 7:
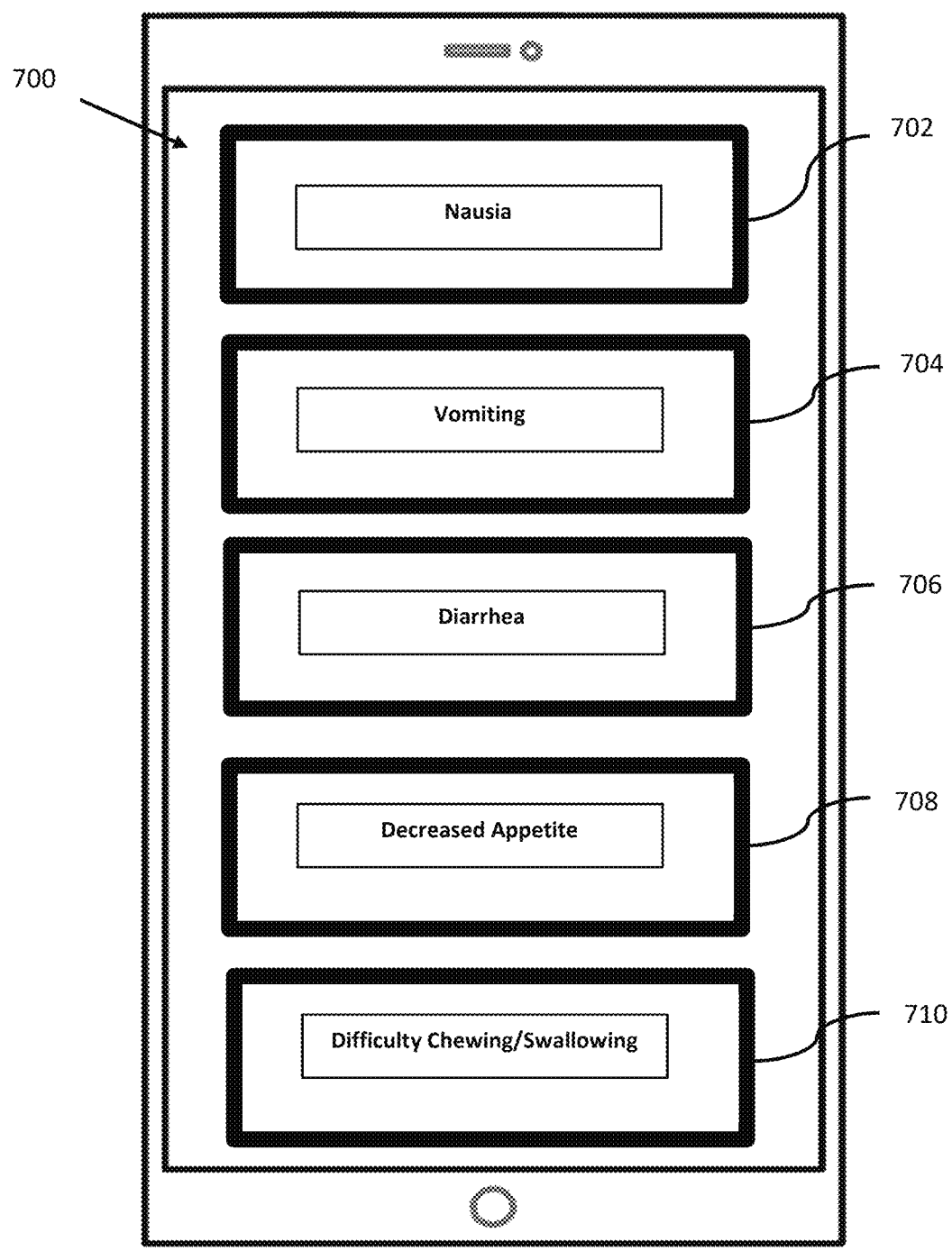
FIG. 7 illustrates a symptom tracker screen according to an embodiment.

For example, the dietitian may view the patient summaries screen 500 of FIG. 5. The patient summaries screen may include multiple patients and for each may include a photo 502 and/or other identifier of the patient, the last meal 504 consumed by the patient, a health score 506 for the meal and/or user, and/or a timestamp 508 of the meal. By selecting a specific patient, the dietitian may view additional information for that patient such as by viewing the patient data screen 600 of FIG. 6.

The patient data screen 600 may include the patient photo/name 602, a diet compliance score 604 (e.g., a percentage of compliance), a health risk score chart 606 showing a score over time, a nutrient tracker 608, and/or a healthier suggestions display 610 that may provide healthier alternative recommendations to reduce risk. The patient data screen 600 may additionally include a significant trends display 612, a weight change display 614, a treatment continuance recommendation display 616 that may take into account machine learning analysis of diet compliance with respect to cancer, a send control 618 for sending information to the patient's oncologist or other stakeholder, and/or a feedback control 620 to share feedback with the patient in real time or near real time.

In an example embodiment, a machine learning backed subject (e.g., food) recognition application for a smart phone may be provided. By using a machine learning backed food recognition application using a smartphone, dietitians and nutritionists serving cancer patients can work with patients to photograph the foods 302 patients are eating and determine not only nutritional content 304 of the food, but get a health risk score 310 based on the diet patients are eating and the portion size of the food they are eating. From the photograph, the machine learning software can identify unhealthy foods and ingredients and recommend healthy alternatives 306.

The machine learning process allows for real time or near real time feedback. For dietitians and nutritionists, there is a health trends aspect of the application where machine learning highlights risks or significant dietary changes that may impact health as well as helps dietitians offer recommendations based on the spirit of the diet. For example, if somebody is eating pasta, the application may suggest chic pea pasta, which is healthier and in the spirit of what they already eat.

Embodiments differ from what currently exists. Current capabilities allow for simple food recognition and calorie intake. There is some nutritional content information, but there is no health risk score or assessment based on the food being photographed. There is also no machine learning system to help nutritionists and dietitians track all their patients and give them alerts to changes of behavior, eating patterns, or risk. The present disclosure fills that void. Furthermore, currently there is no dashboard that allows the dietitian to review all patients 500, receive real time updates, and send feedback 620 back to the patient to get the patient back on track.

Moreover, related-art systems have not trained their data on USDA guidelines cross referenced with American Association for Cancer Research (AACR) dietary guidelines as well as specific treatment recommendations provided by a medical professional. Related-art systems also do not have a methodology measuring portion size. Related-art systems have not taken the time to properly label data so even the food recognition itself has inaccuracies.

An embodiment of the present disclosure may label not just standard western foods, but also may label ethnic and fusion dishes as well to provide increased accuracy. An embodiment also may use data from USDA health guidelines and risk assessments from NIH and AACR in order to provide the ability to highlight a health risk score based on nutritional intake and provide machine learning analysis to flag to the nutritionist, dietitian, and patient risk scores 506, significant changes in diet/food intake 604-608, and early signs of medical problems.

An embodiment can also produce portion size data on the food. Embodiments can be used with tablets and either a web-based application or app store/google play store version of the app.

An example embodiment may enable the following:

1. Cancer patient (or any user) photographs a plate of food (e.g., 300 of FIG. 3) that is displayed on their smart phone;
2. The cancer patient (or any user) receives instant feedback on nutritional content of the food (e.g., 302 of FIG. 3), portion size, and a health risk score (e.g., 310 of FIG. 3) based on AACR recommendations, dietitian provided meal plans, and USDA macronutrient information for food. If they are eating too many unhealthy foods, the application will suggest healthy alternatives (e.g., 306 of FIG. 3) close to what they are already eating, such as suggesting cauliflower rice as a substitute for regular rice;
3. The cancer patient (or any user) receives healthy alternatives to any foods that are unhealthy or risky (e.g., 306 of FIG. 3);
4. Information may be instantly shared with the dietician/ nutritionist working with the patient and the oncologist;
5. Nutritionists and dietitians have an interface 500 that allows them to visually see all their patients, the last meal they ate (e.g., 504), current health risk score (e.g., 506), and a date/time stamp (e.g., 508) for the last meal and/or current health risk score. The machine learning gives them analysis on risk trends, significant dietary or food intake challenges, and problematic eating behavior. This information may be instantly shared with the patient's doctor; and
6. Aggregate nutritional health information (no personal data) may be shared with NIH researchers to measure trends.

According to an embodiment, a method may include receiving a digital image of a subject (e.g., food) in/by an application executing on a computing device. For example, the user may photograph food using their smart phone. The method may include identifying a subject and a quantity of the subject by applying a machine learning tool to evaluate the digital image, determining at least one characteristic of the subject based on the identified subject and subject quantity, and correlating the at least one subject characteristic to a user score. For example, machine learning analyzes the image, correctly identifies it (including quantity), and provides the nutritional content and health risk score. The method also may include identifying an alternative subject based on the at least one subject characteristic and the user score, and providing the alternative subject identity and a corresponding quantity. For example, the user also may receive healthy alternative recommendations for unhealthy food.

The method may include communicating at least one of the subject identity, subject quantity, the at least one subject characteristic, and the user score to a data provider. Communication to the data provider may be via a secure medium. For example, information may be automatically shared with the dietician/nutritionist supervising the care of the patient. Machine learning analysis may provide real time health risk score analysis based on diet, and may flag significant changes in eating behavior or nutritional intake. A health provider may view an interface 500 where they can view all their patients at once and then toggle between individual patients 600. Additionally, aggregate nutritional trends (no personal data) may be shared with NIH researchers to analyze trends.

According to an embodiment, when the patient (or user) takes a photograph, backend machine learning may recognize subjects (foods) within the image and the nutritional information, portion size, and health risk correlation. Machine learning may assign a health risk score to the patient, which may be derived from American Association of Cancer Research (AACR) dietary recommendations, USDA micronutrient information, and specific individual diet plans, individually or in combination to provide a risk assessment. For example, correlating of the at least one subject characteristic to the user score may include receiving at least one correlation value for the at least one subject characteristic from a data provider, such as an AACR or USDA dietary source.

As described above, embodiments also may assign healthier alternatives. For example, if the patient is eating too much pasta, which contains sugars, the application may recommend something like chickpea pasta. The recommendations will be healthy alternatives to what the patient is already eating. This information may be instantaneously shared with the dietitian/nutritionist/medical professional. The dietitian/nutritionist may receive real time machine learning backed analysis on health risk based on nutrition, significant changes in eating behavior or nutritional intake, and may receive immediate alerts on any concerns via the notification system. Data can also be shared, with user consent, to any other user such as an accountability partner. Alternatively, a dietitian can input the dietary recommendations/meal plans, and the user can automatically accept that diet into their profile, and the risk score may compare nutritional intake to the plan they are assigned to follow.

According to an embodiment, a team may analyze many (e.g., thousands) images and data libraries to label data for various food images. Machine learning software may correlate nutritional information from USDA guidelines, AACR guidelines, and NIH food health risk assessment. This information may serve as a backbone of a health risk score. This information, in conjunction with the above discussed techniques, may enable software to make the correlation of "if the image is this kind of food, it has this nutritional content and has a health risk score of X." Data from AACR guidelines and USDA nutritional information may be received.

When a patient takes a photo, which captures the above information and may automatically send this information to cancer dietitians, the information may be added to the supervising dietitian's dashboard 500. The dietitian may receive data for all patients and may receive alerts for changes in risk score, whether a patient is missing key nutrients in their meals based on their diet plans, and allows for quick intervention. The dashboard 500 may present the information by showing a picture 502 of the patient, last meal eaten 504 with date/time stamp 508, and current health risk score 506. The dietitian may select an individual patient and can see more in-depth data, such as a trend analysis 606, recommended alternative foods 610, and correlate reactions to medication and treatment to dietary intake. They also may receive customized alerts so that they can take immediate action instead of relying on manual analysis.

For example, if a patient's risk score changed from low to medium, or if a patient did not meet their protein requirements, dietitians may get an instant alert, allowing for a quick intervention before the problem gets out of hand where it can cause patient harm or force a patient to cancel a treatment session due to lack of nutrients. The dietitian can share this with an oncology team who needs to make sure patients are receiving the right nutrients to continue treatment.

Existing food digital libraries may be utilized and new ones created to obtain a comprehensive index of foods that a computing device (e.g., smart phone with a camera) may recognize. Software may correlate the food image to the USDA nutritional data of the food items, AACR guidelines, and NIH risk data of foods (for example, sugar has risks for diabetes and certain cancers). This enables the user to receive the output of nutritional value and health risk score. Software may include healthy alternatives to foods, for example, in an internal database, or may receive such from an external database. For example, pasta is high in sugars that can be risky, so if the user is eating too much pasta, the software may recommend squash noodles or another healthy alternative. A dashboard may be provided that allows dietitians to track all their patients in real time or near real time, as descried above. A screen (interface) may include a picture of a patient, a last meal eaten plus date/time, and a risk score. The dietitian can then further examine each individual patient to receive more detailed information such as health risk trends.

Figure 10:
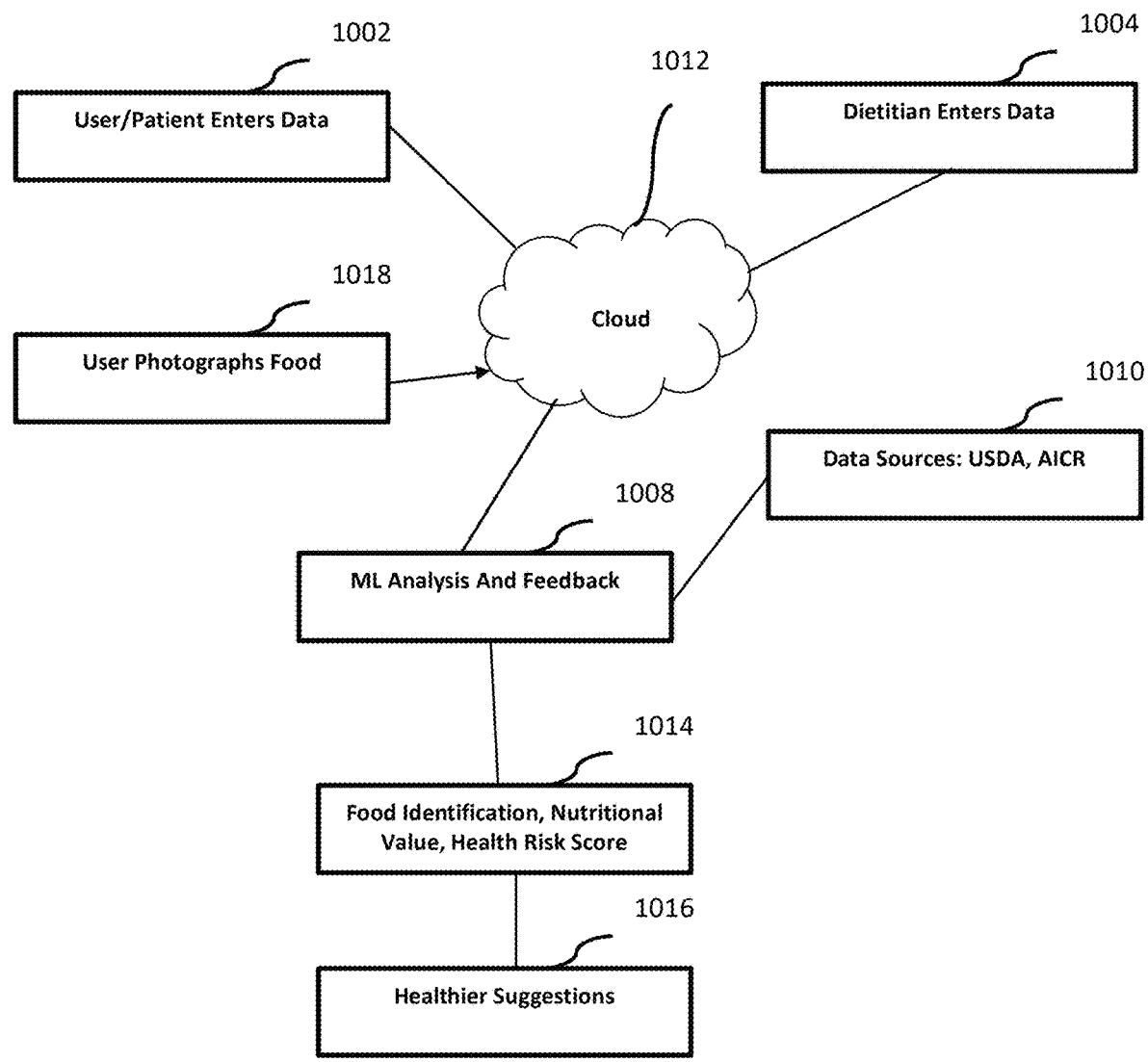
FIG. 10 illustrates a software schema/architecture according to an embodiment.
Figure 11:
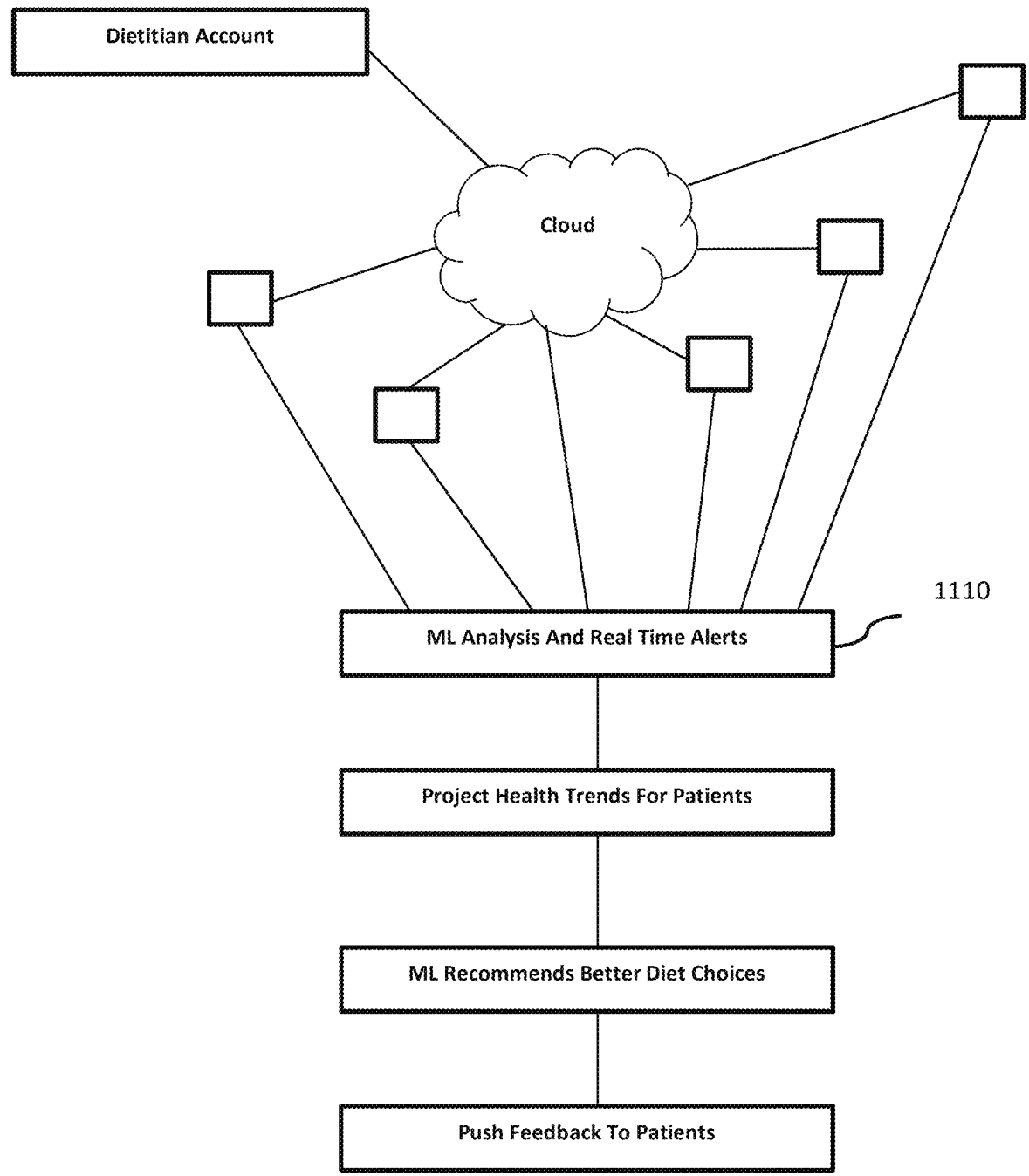
FIG. 11 illustrates dietitian account configuration according to an embodiment.

FIG. 10 illustrates a software schema/architecture according to an embodiment. FIG. 11 illustrates dietitian account configuration according to an embodiment. A front-end interface 200 or 500 may allow users or the dietitian to fill out the personal biographic information, customized dietary plans/goals, height/weight, etc. to allow for customized outputs based on this user information 1002 and 1004.

According to an embodiment, middleware and/or backend processing may connect machine learning image analysis 1008 to, e.g., customized tables 1010 built from AACR, USDA, and NIH guidelines. Embodiments may factor in the customized dietary needs of the user. The machine learning model, middleware and/or backend processing may be hosted remotely (e.g., in the cloud 1012). Backend processing may continuously analyze food intake to the specified plans and nutritional goals based on dietitian input as well as AACR, USDA, and NIH guidelines. These guidelines may be provided, e.g., from an oncologist and/or dietitian. Output 1014 and 1016 may be based on this analysis and funneled back to both the front-end interface of the application (user interface) and the dietitian dashboard 500.

In an embodiment, react native may be used for front end interface development, python may be used for computer vision/object recognition, and JavaScript and python may be used for the middleware and/or backend processing.

Enhanced visual capabilities may allow for improved photo accuracy in dimmer lighting conditions. Audio aids may be provided for the visually impaired. A dashboard may help the dietitian track food intake, monitor health risk score and trends, and help make correlations between dietary intake and other health conditions, reaction to medication and treatment, and keep a treatment team connected in real time.

In an embodiment, an ability may be included to highlight nearby locations where users can purchase foods that the software recommends for improved health.

According to an embodiment, a user may take a picture of food they are eating (1018 of FIG. 10). This single action then may lead to the software providing instant feedback on nutritional value and a health risk score based on the foods users are eating. This information may then be instantly shared with a supervising medical professional treating the cancer patient (e.g., nutritionist/dietician/oncologist). The nutritionist/dietitian/oncologist may receive instant feedback on health risk score, the foods the patient is eating, and machine learning may flag any significant changes in food intake or eating behavior (1110 of FIG. 11). Embodiments may provide alerts to these professionals so that they can address problems before they get out of hand. The professional working with the patient may be provided an interface including a picture of each patient, the last food item a patient ate, the current health risk score for a patient, and date/time of last meal. Finally, the dietitian can correlate any health conditions to dietary plans, reaction to medicine and treatment, and analyze trends to continuously create a better patient experience.

In yet other embodiments, consumers may determine a health value of foods and even a source of where such food was produced. For example, from a photo, a user may find out whether carrots were organically farmed, regeneratively farmed, or industrially farmed. A user could also photograph foods in a grocery store and get healthy recipe recommendations for that food.

Figure 12:
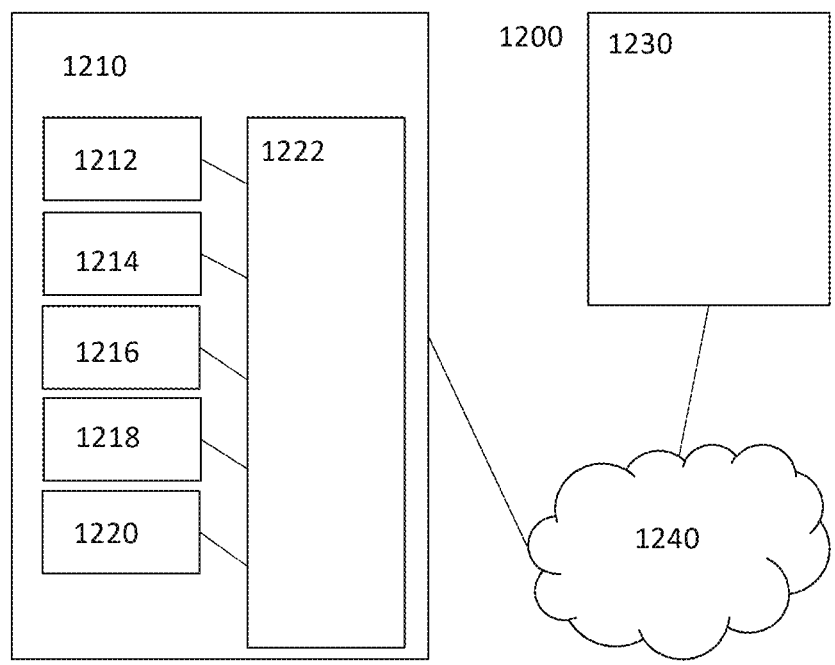
FIG. 12 illustrates a system including a computing device and a network node according to an embodiment.

FIG. 12 illustrates a system 1200 including a computing device 1210 and a network node 1230 according to an embodiment. The system 1200, computing device 1210, and/or network node 1230 may be configured for executing one or more operations and/or methods described herein. According to an embodiment, the computing device 1210 may include a memory 1212, an image capturing device (e.g., a camera) 1214, a user interface 1216, a communication interface 1218, one or more processors 1220, and a communication bus 1222. The communication bus 1222 may interconnect each of the memory 1212, the image capturing device 1214, the user interface 1216, the communication interface 1218, and the one or more processors 1220. The computing device 1210 may be in communication with the network node 1230 via a network 1240 such as the Internet. The network node 1230 may include one or more similar components to the computing device 1210.

Although example embodiments have been disclosed, it will be apparent to those skilled in the art that various changes and modifications can be made which will achieve some of the advantages of embodiments without departing from the spirit and scope of the disclosure. Such modifications are intended to be covered by the appended claims.

Further, in the description and the appended claims, the meaning of "comprising," "having," "including," and the like are not to be understood as excluding other elements or operations. Further, "a" or "an" does not exclude a plurality, and a single unit may fulfill the functions of several mechanisms recited in the claims.

The phrase "at least one of" is intended to include the meaning of "at least one selected from the group of" for the purpose of its meaning and interpretation. For example, "at least one of A and B" may be understood to mean any combination including "A, B, or A and B."

The above description of illustrated embodiments and what is described in the Abstract below, is not intended to be exhaustive or to limit the embodiments to the precise forms disclosed. Although specific embodiments of examples are described herein for illustrative purposes, various equivalent modifications can be made without departing from the spirit and scope of the disclosure, as will be recognized by those skilled in the relevant art.

The various embodiments described above can be combined to provide further embodiments. Aspects of the embodiments can be modified, if necessary, to employ concepts of the various disclosures to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method comprising:
receiving a digital image of a subject in/by an application executing on a user computing device, the subject being a food item;
identifying the subject and a quantity of the subject by applying a machine learning tool to evaluate the digital image;
determining at least one characteristic of the subject based on the identified subject and subject quantity;
correlating the at least one subject characteristic to a user score;
identifying an alternative subject based on the at least one subject characteristic and the user score;
outputting the alternative subject identity and a corresponding quantity via a user interface;
transmitting the user score ultimately to a dietitian computing device via a communication interface;
receiving, via the communication interface, feedback ultimately from the dietitian computing device; and
outputting, via the user interface, the feedback received from the dietitian computing device.

2. The method of claim 1, further comprising:
communicating at least one of the subject identity, subject quantity, the at least one subject characteristic and the user score to a data provider.

3. The method of claim 2, wherein the communication to the data provider is via a secure medium.

4. The method of claim 1, wherein the correlating of the at least one subject characteristic to the user score comprises:
receiving at least one correlation value for the at least one subject characteristic from a data provider.

5. The method of claim 4, wherein the data provider is an American Association of Cancer Research (AACR) dietary source.

6. The method of claim 4, wherein the data provider is a United States Department of Agriculture (USDA) dietary source.

7. The method of claim 1, wherein the computing device is a smartphone.

8. The method of claim 1, further comprising:
receiving another digital image of another subject in/by the application;
identifying the another subject and a quantity of the another subject by applying the machine learning tool;
determining another at least one characteristic of the another subject based on the identified another subject and another subject quantity;
correlating the another at least one subject characteristic to the user score;
determining a user health trend based on at least one of the subject, the subject quantity, and the at least one characteristic of the subject, and at least one of the another subject, the another subject quantity, and the another at least one characteristic.

9. The method of claim 8, further comprising:
communicating the user health trend to a data provider.

10. The method of claim 8, further comprising:
generating a user health risk score chart plotting the user health trend, wherein
the user health risk score chart comprises a time-series plot of user scores derived from multiple subjects.

11. The method of claim 1, further comprising:
receiving an input of a user symptom;
correlating the user symptom to at least one of the subject and the quantity of the subject; and outputting the correlated user symptom and the at least one of the subject and the quantity of the subject, wherein
the user symptom is selected from a predefined set of symptoms associated with dietary intake.

12. A user computing device comprising:
a memory, an image capturing device, a user interface, a communication interface, a processor and a communication bus interconnecting each of the memory, the image capturing device, the user interface, the communication interface and the processor, wherein
the user interface is configured to:
  receive identifying information from a user; and
  present information to the user,
the image capturing device is configured to:
  capture an image of a subject, the subject being a food item,
the communication interface is configured to:
  communicate data with a node at a network location, the node further comprising a network memory, a network processor and a network communication interface;
  transmit the user score to a dietitian computing device; and
  receive feedback from the dietitian computing device,
the processor is configured to:
  identify the captured image and a quantity of the subject by applying a machine learning tool to evaluate the image;
  determine at least one characteristic of the subject based on the identified subject and subject quantity;
  correlate the at least one subject characteristic to a user score; and
  identify an alternative subject based on the at least one subject characteristic and the user score, and
the memory is configured to:
  store the user identifying information, the captured image and quantity data, the at least one subject characteristic, the user score and the alternative subject identity, wherein the user interface is further configured to:
    output the alternative subject identity and a corresponding quantity; and
    output the feedback received from the dietitian computing device.

13. The user computing device of claim 12, wherein the communication interface is further configured to communicate at least one of the subject identity, the subject quantity, the at least one subject characteristic, and the user score to a data provider.

14. The user computing device of claim 13, wherein the communication interface is configured to communicate to the data provider via a secure medium.

15. The user computing device of claim 12, wherein
the communication interface is further configured to receive at least one correlation value for the at least one subject characteristic from a data provider, and
the processor is configured to correlate the at least one subject characteristic to a user score based on the at least one correlation value.

16. The user computing device of claim 15, wherein the data provider is the American Association of Cancer Research (AACR) dietary source.

17. The user computing device of claim 15, wherein the data provider is the United States Department of Agriculture (USDA) dietary source.

18. The user computing device of claim 12, wherein the computing device is a smartphone.

19. The user computing device of claim 12, wherein
the image capturing device is further configured to:
  capture another digital image of another subject, and
the processor is further configured to:
  identify the another digital image and a quantity of the another subject by applying the machine learning tool to evaluate the another digital image;
  determine another at least one characteristic of the another subject based on the identified another subject and subject quantity;
  correlate the another at least one subject characteristic to the user score; and
  determine a user health trend based on at least one of the subject, the subject quantity, and the at least one characteristic of the subject, and at least one of the another subject, the another subject quantity, and the another at least one characteristic.

20. The user computing device of claim 19, wherein the communication interface is further configured to:
  communicate the user health trend to a data provider.

* * * * *